(12) United States Patent
Cheng

(10) Patent No.: US 7,363,943 B2
(45) Date of Patent: Apr. 29, 2008

(54) MULTI-STAGE PEDAL CONTROL WATER SUPPLY

(75) Inventor: Kuei-Lin Cheng, Lujhu Township, Taoyuan County (TW)

(73) Assignee: Business Zone Ltd., Taoyuan Countty (TW)

( * ) Notice: Subject to any disclaimer, the term of this patent is extended or adjusted under 35 U.S.C. 154(b) by 0 days.

(21) Appl. No.: 11/514,336

(22) Filed: Sep. 1, 2006

(65) Prior Publication Data

US 2008/0053542 A1 Mar. 6, 2008

(51) Int. Cl.
 *F16K 11/02* (2006.01)
 *F16K 31/62* (2006.01)
(52) U.S. Cl. .............................. 137/625.4; 137/625.42; 251/243; 251/294; 251/295
(58) Field of Classification Search ................ 251/294, 251/295, 231, 236, 242, 243; 74/512; 137/625.4, 137/625.42
 See application file for complete search history.

(56) References Cited

U.S. PATENT DOCUMENTS

| | | | | |
|---|---|---|---|---|
| 1,176,784 A | * | 3/1916 | Speiden | 251/295 |
| 1,212,085 A | * | 1/1917 | Metcalf | 251/295 |
| 1,366,120 A | * | 1/1921 | Dederer | 251/295 |
| 1,627,020 A | * | 5/1927 | Dougherty | 251/295 |
| 1,970,039 A | * | 8/1934 | Fraser | 251/295 |
| 2,188,258 A | * | 1/1940 | Zinkil et al. | 251/295 |
| 2,287,011 A | * | 6/1942 | Beebe | 251/295 |
| 2,775,135 A | * | 12/1956 | Phillips, Jr. | 251/295 |
| 2,830,618 A | * | 4/1958 | Mitchell | 251/295 |
| 2,929,405 A | * | 3/1960 | Beebe | 251/295 |
| 2,965,906 A | * | 12/1960 | Booker et al. | 4/624 |
| 3,019,810 A | * | 2/1962 | Aymar et al. | 251/295 |
| 4,427,177 A | * | 1/1984 | Constantinescu et al. | 251/294 |
| 5,199,119 A | * | 4/1993 | Weber | 251/295 |
| 5,230,365 A | * | 7/1993 | Woltz et al. | 251/294 |
| 5,263,684 A | * | 11/1993 | McGuire | 251/294 |
| 5,322,084 A | * | 6/1994 | Ghiassian | 251/295 |
| 5,386,600 A | * | 2/1995 | Gilbert, Sr. | 251/295 |
| 6,352,240 B1 | * | 3/2002 | Eckstein et al. | 251/295 |
| 6,722,623 B1 | * | 4/2004 | Chen | 251/295 |

* cited by examiner

*Primary Examiner*—John Bastianelli
(74) *Attorney, Agent, or Firm*—Troxell Law Office, PLLC

(57) ABSTRACT

A multi-stage pedal control water supply installation includes a tap provided with water inlet and water outlet, a control valve with orifice, a linking unit, one or a plurality of pedal, and a flow control unit; the flow control unit being disposed by one side of the pedal to interfere with displacement of the pedal thus for the linking unit to control the overlapped area between water inlet and water out at the valve orifice to achieve the purpose of water supply at various stages with variable amount of water supplied.

13 Claims, 15 Drawing Sheets

MULTI-STAGE PEDAL CONTROL WATER SUPPLY

BACKGROUND OF THE INVENTION (a) Field of the Invention

The present invention is related to a multi-stage pedal control water supply installation, and more particularly, to one that controls the water supply by a pedal without touch by hand.

(b) Description of the Prior Art

When fetching the water from a tap, the water source directly supplies the water to the tap; and by turning the tap, water supply condition (e.g., flow amount and flow duration) is controlled by turning the tap. Therefore, under the normal water supply, once the tap is turned on, the water continues to deliver through the tap to facilitate the user to fetch for water. However, water resource can be easily wasted when the tap is left open for longer time or is not firmly retighten after use. Also, the tap can conveniently become a medium of source of infection and contamination if not regularly cleaned particularly for taps in public place.

Furthermore, whereas the tap must be turned by hand for the control of the water flow, it is inconvenient for a handicapped person who fails or feels awkward to turn the tap, e.g., having to bend down while washing his/her hair in bathroom.

SUMMARY OF THE INVENTION

The primary purpose of the present invention is to provide a multi-stage pedal control water supply installation that allows control of the water supply without hand touch and of the water flow by stage.

To achieve the purpose, the present invention includes a tap provided with water inlet and water outlet, a control valve with orifice, a linking unit, one or a plurality of pedals, and a flow control unit. The flow control unit is disposed by one side of the pedal to interfere with displacement of the pedal thus for the linking unit to control the overlapped area between water inlet and water out at the valve orifice to achieve the purpose of water supply at various stages with variable amount of water supplied.

DETAILED DESCRIPTION OF THE PREFERRED EMBODIMENTS

Figure 1:
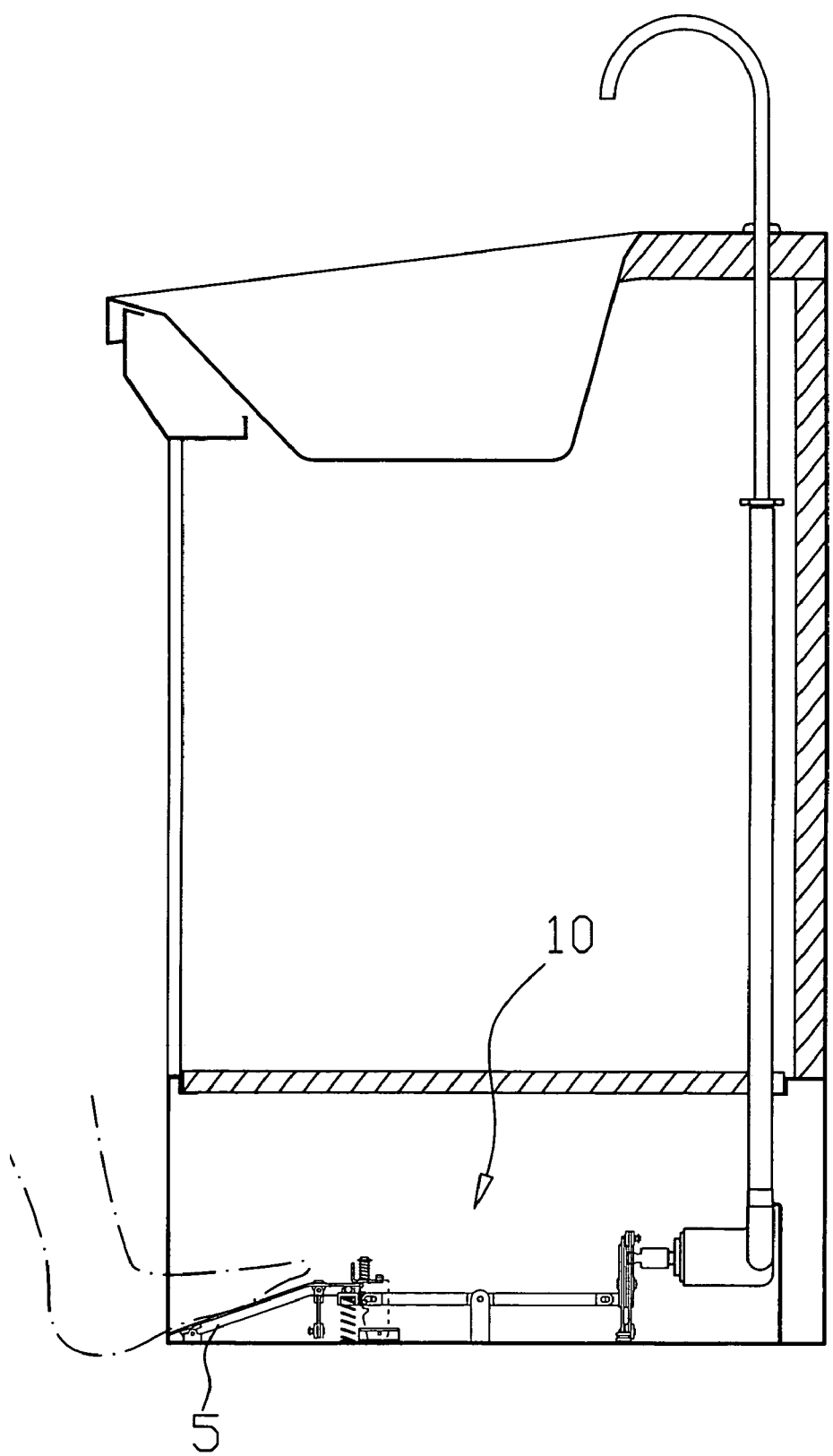
FIG. 1 is a schematic view showing an operating status of a first preferred embodiment of the present invention.

Referring to FIG. 1, a multi-stage pedal control water supply installation of the present invention includes a water supply installation 10 and a pedal 5 to control water supply and amount by stage without hand touch. The installation 10 includes a tap 1, a control valve 2, a temperature control unit 3, a linking unit 4, a pedal 5 and a flow control unit 6.

The tap 1 containing a chamber 11; a coldwater inlet 12, a hot water inlet 13, and a water outlet 14 are disposed in the chamber 11, and the control valve 2 is inserted into the chamber 11.

Figure 2:
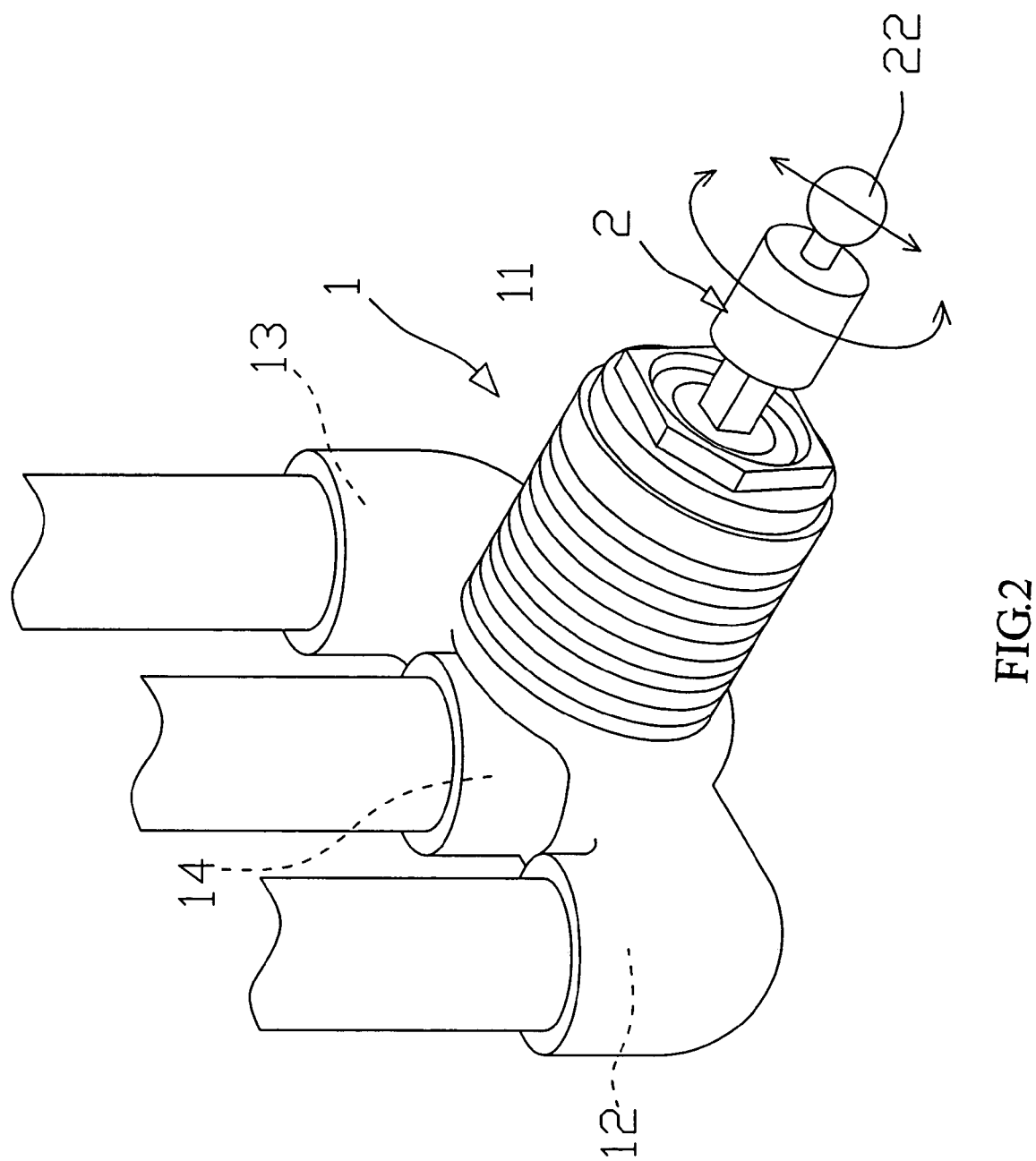
FIG. 2 is a perspective view showing the construction of a tap and a control valve of the first preferred embodiment of the present invention.
Figure 3:
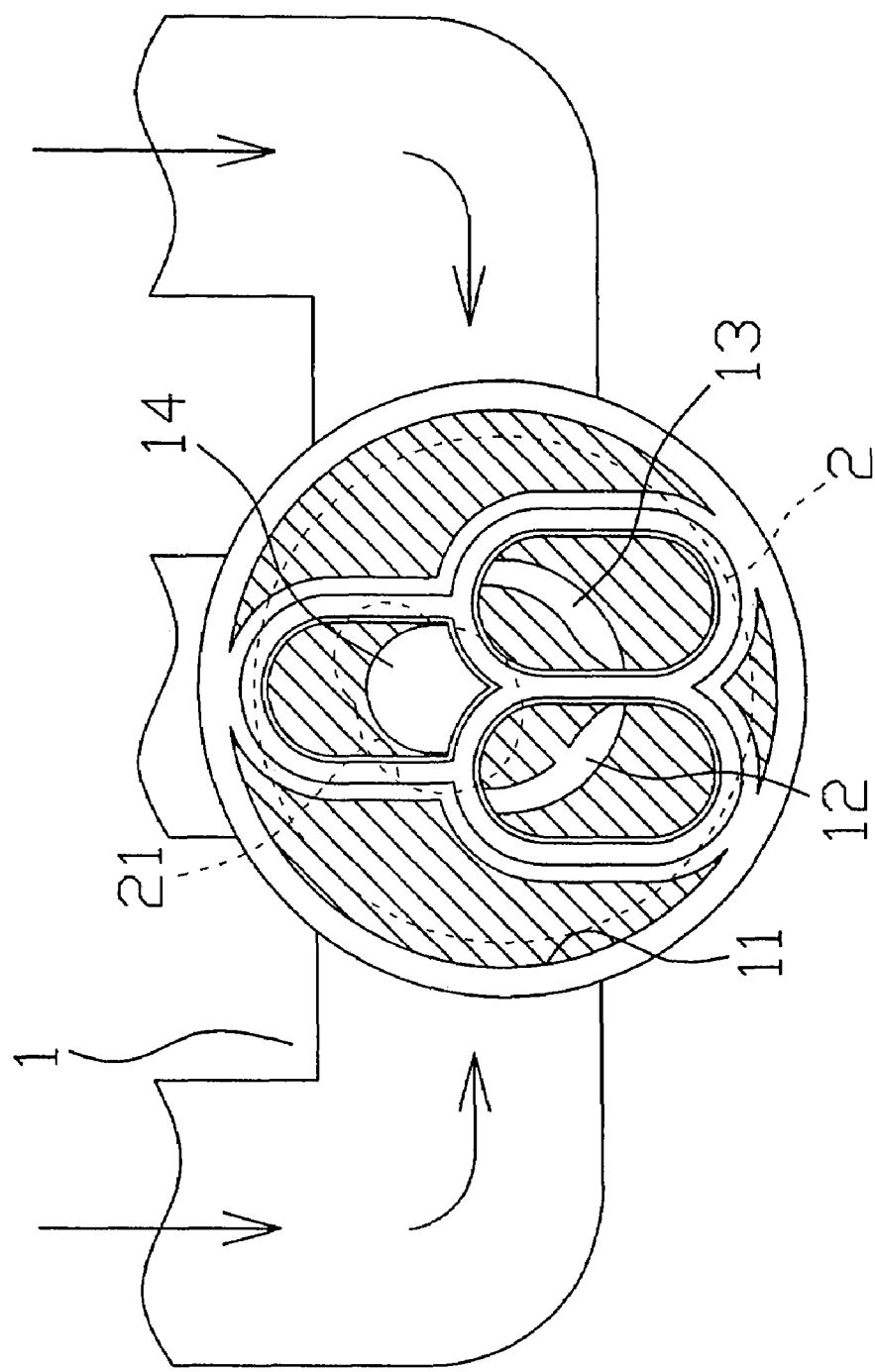
FIG. 3 is a schematic view showing a construction of the first preferred embodiment of the present invention in a status when water is not supplied.
Figure 4:
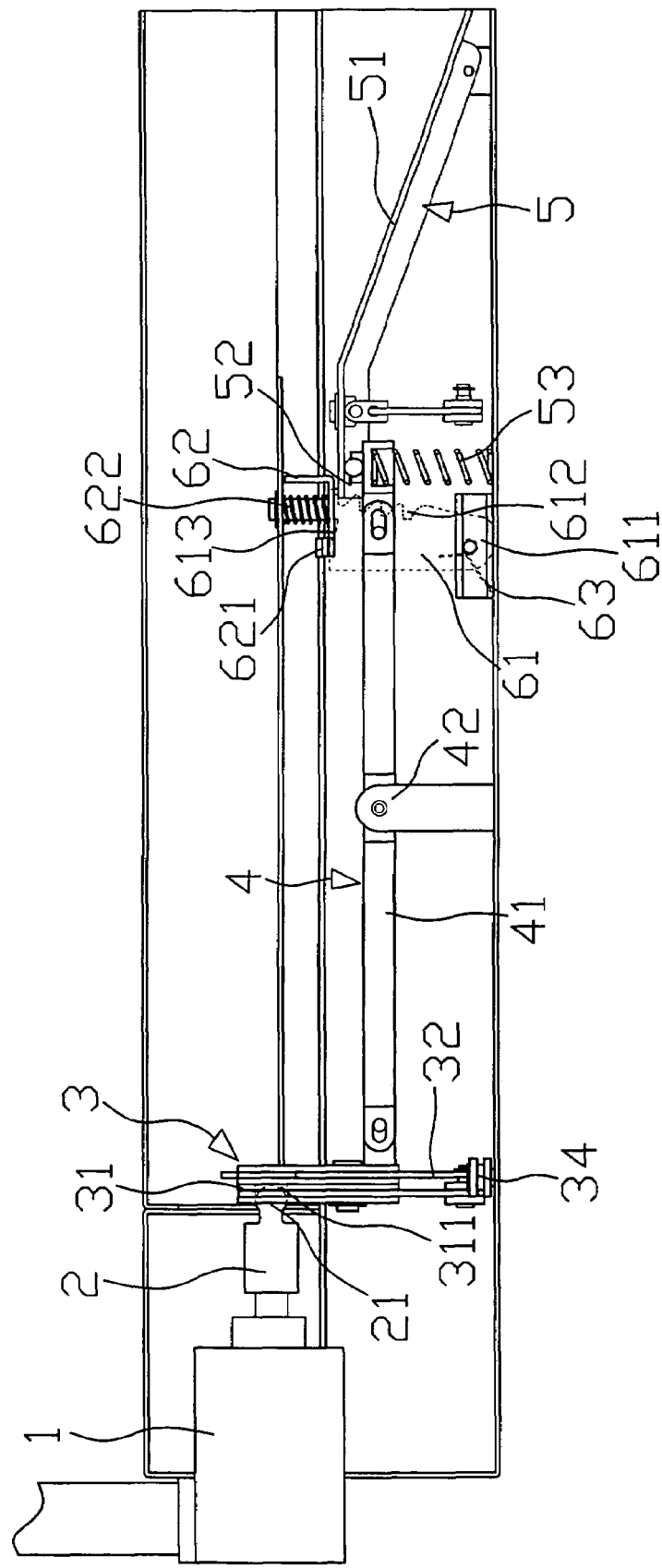
FIG. 4 is a schematic view showing a construction of the first preferred embodiment of the present invention.

An orifice 21 is formed at where the control valve 2 extends into the chamber 11 as illustrated in FIGS. 2, 3, and 4; a ball assembly 22 provided on one side of the control valve 2 is connected to one side of the linking unit 4 by means of the temperature control unit 3.

Figure 5:
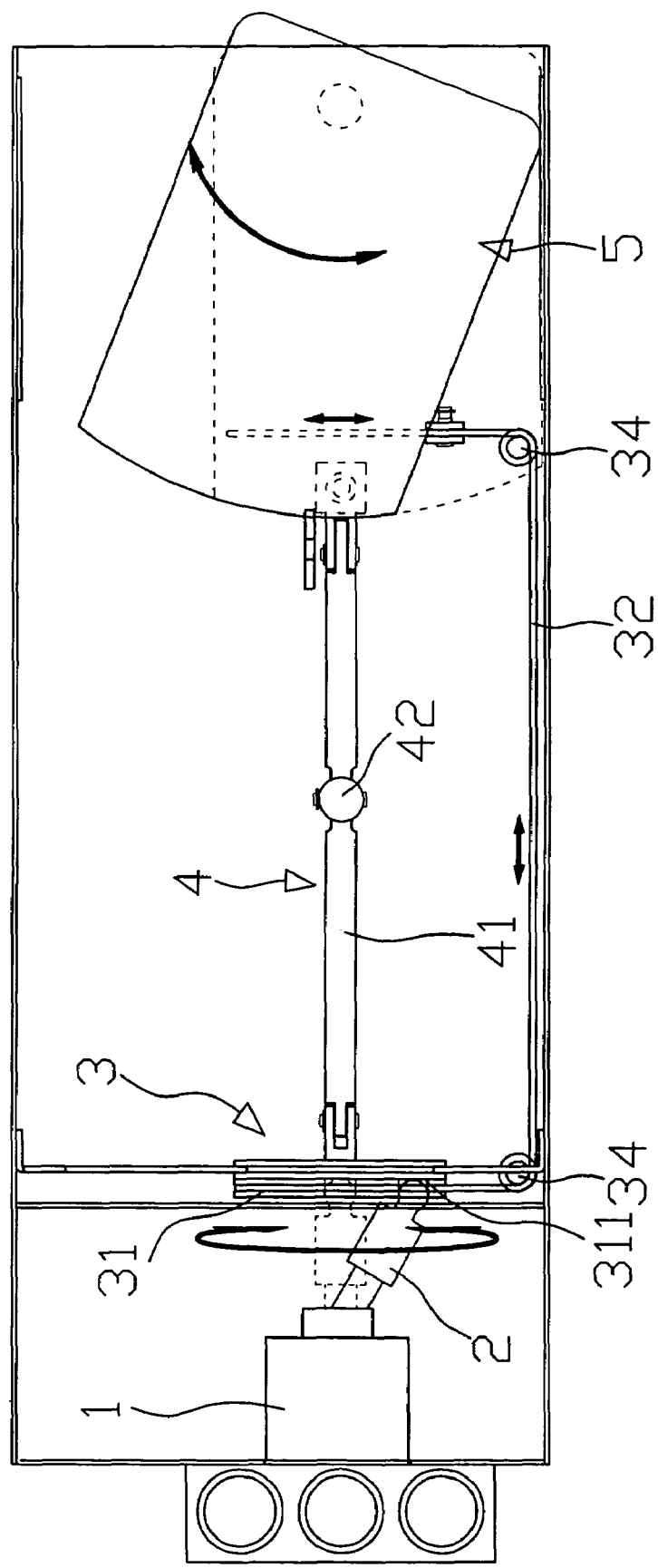
FIG. 5 is a schematic view showing that a pedal slides to its side of pedal in the first preferred embodiment of the present invention.
Figure 6:
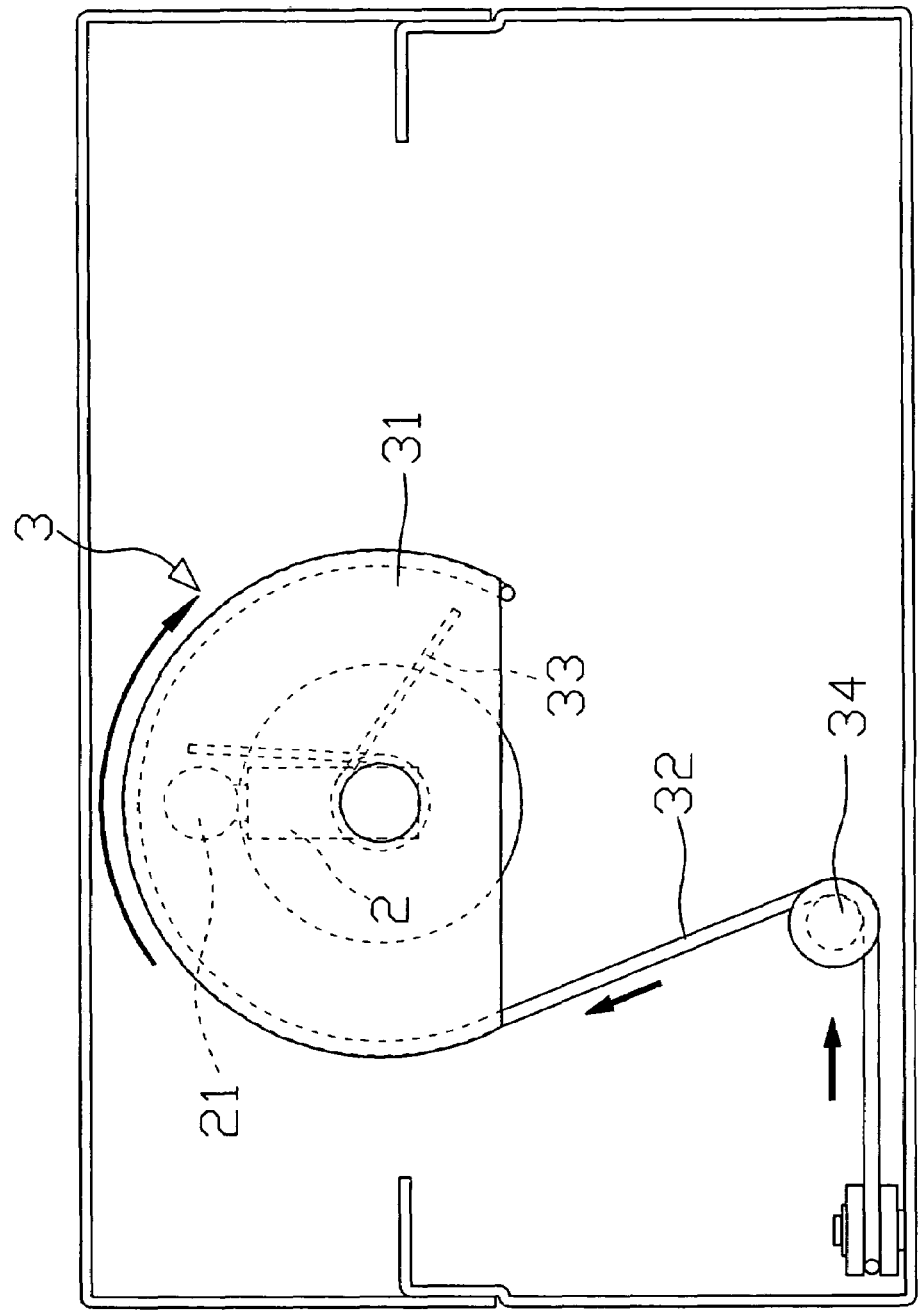
FIG. 6 is a schematic view showing a construction of a temperature control unit in the first preferred embodiment of the present invention.

As illustrated in FIGS. 4, 5, and 6, a turntable 31, a drive member 32, and a return member 33 (may be provided in the form of a coil) are disposed to the temperature control unit 3. A slot 311 is disposed on one side of the turntable 31 to be pivoted to the control valve 2 and the linking unit 4 is pivoted to the other side of the turntable 31. The drive member 32 (may be provided in the form of a cable) has its one side fixed to where below the turntable 31 to go around the perimeter of the turntable 31 and pass through two pulleys 34 to connect to the pedal 5. The return member 33 is disposed to the turntable 31 for providing the force to return the turntable 31 when rotated.

One or a plurality of pedals 5 is provided and a single pedal 5 is provided in the preferred embodiment of the present invention for the user to step on the pedal for the control of the movement of the control valve through the linking unit 4 and the temperature control unit 3. The pedal 5 further includes an operating board 51, a locking block 52 and a return member 53.

The flow control unit 6 disposed on one side of the pedal 5 to interfere with the displacement of the pedal 5 further includes a multi-stage catching plate 61, a limit plate 62, and a return member 63. The multi-stage catching plate 61 is provided with a locking portion 611 secured on one side of the installation 10 at where closer to the pedal 5. Multiple catching portions 612 arranged not on the same level from one another are disposed on one side closer to the pedals 5 to be contained by the locking block 52 of the pedal 5. A trough 613 is disposed at the top of the flow control unit 6. The limit plate 62 provided at where above the multi-stage catching plate 61 and the pedal 5 includes a locking portion 621 and a return member 622 with both to be secured to the trough 613 while the return member 63 is disposed to the multi-stage catching plate 61 at where closer to one side of the locking portion 611.

When the installation 10 is in its normal status, i.e., no water is supplied as illustrated in FIG. 3. The area of the orifice 12 at the water outlet 14 is overlapped with that of the water outlet 14 while the remaining portion of the orifice 21 shelters both of the coldwater inlet 12 and the hot water inlet 13 so to stop water supply at either inlet 12 or 13 from flowing through the orifice 21 into the water outlet 14.

Figure 7:
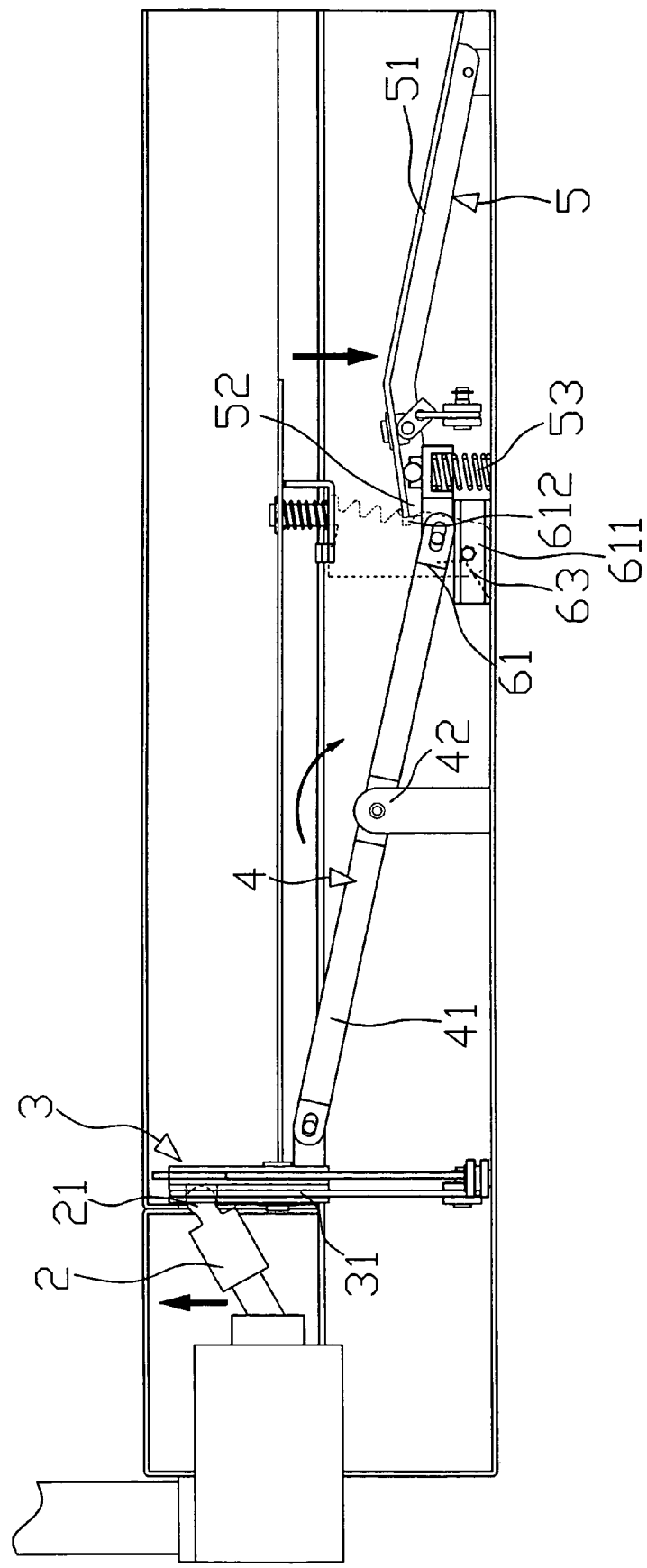
FIG. 7 is a schematic view showing that the pedal moves downward in the preferred embodiment of the present invention.
Figure 8:
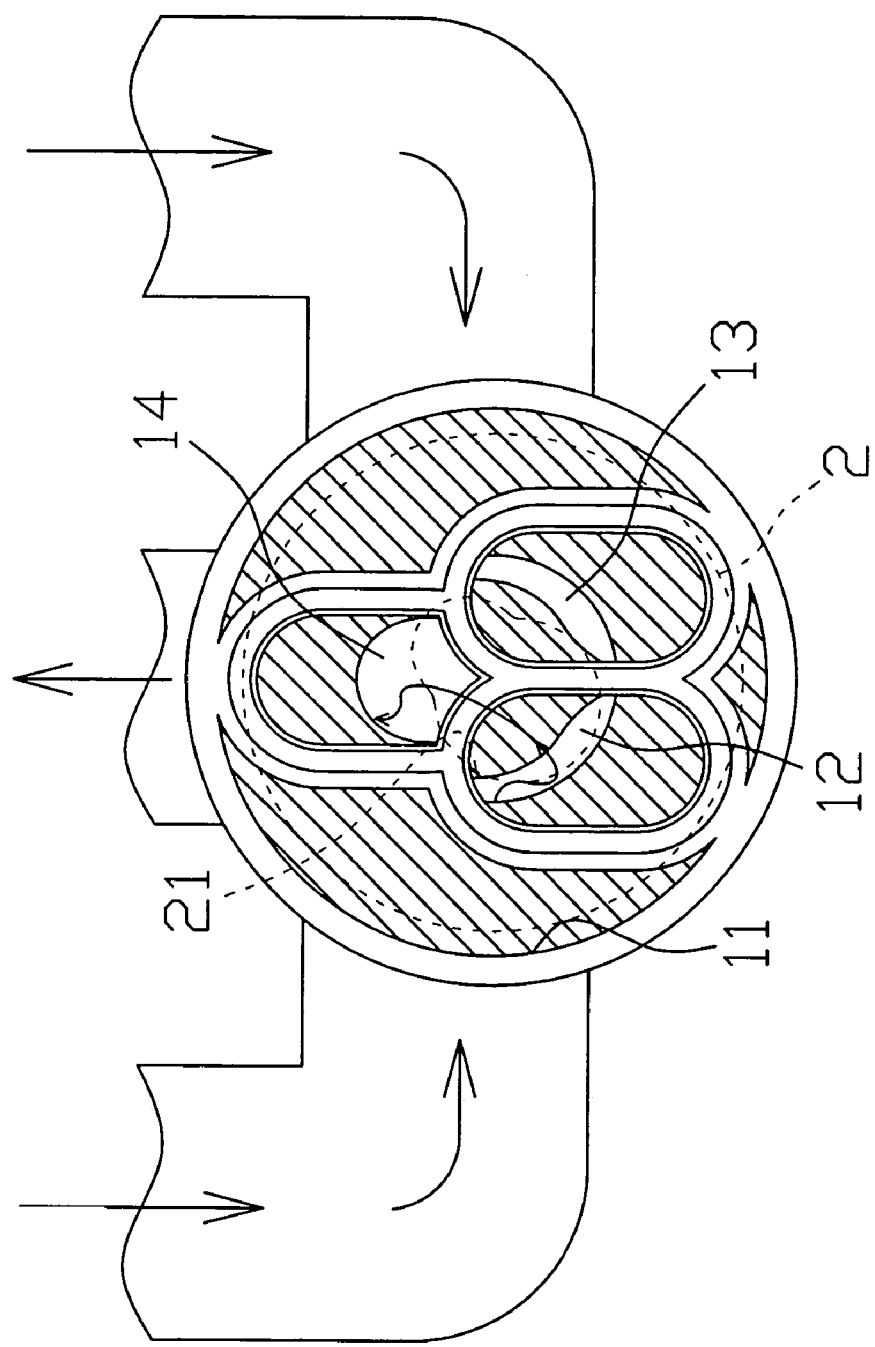
FIG. 8 is a schematic view showing a construction of cold water supply of the first preferred embodiment of the present invention.

When the user steps on the operating board 51 as illustrated in FIG. 7, the locking block 51 and one end of a cartridge stem 41 move downward at the same time. Meanwhile another end of the cartridge stem 41 moves upward to further push up the control valve 2 through the temperature control unit 3; and the orifice 21 in the control valve 2 moves downward as illustrated in FIG. 8 for the area of the orifice 21 to partially overlap with that of the coldwater inlet 12 and the water outlet 14. Accordingly, coldwater from the coldwater inlet 12 enters through the orifice 21 into the water outlet 14 to be delivered for fetching by the user. Wherein, the locking block 51 engages with a particular catching portion 162 to control the amount of the downward displacement of the pedal 5. The multi-stage catching plate 61 pivots toward another side of the catching portion 612 with the locking portion 611 as the axis for the control valve to create a different displacement by changing the size of the overlapped area of the orifice 21 at where between the coldwater inlet 12 and the water outlet 13 thus to control the water flow amount from the coldwater inlet 12 into the water outlet 13 for achieving the purpose of supplying water by stage without interruption since the pedal is subject to the catch by the multi-stage catching plate.

Figure 9:
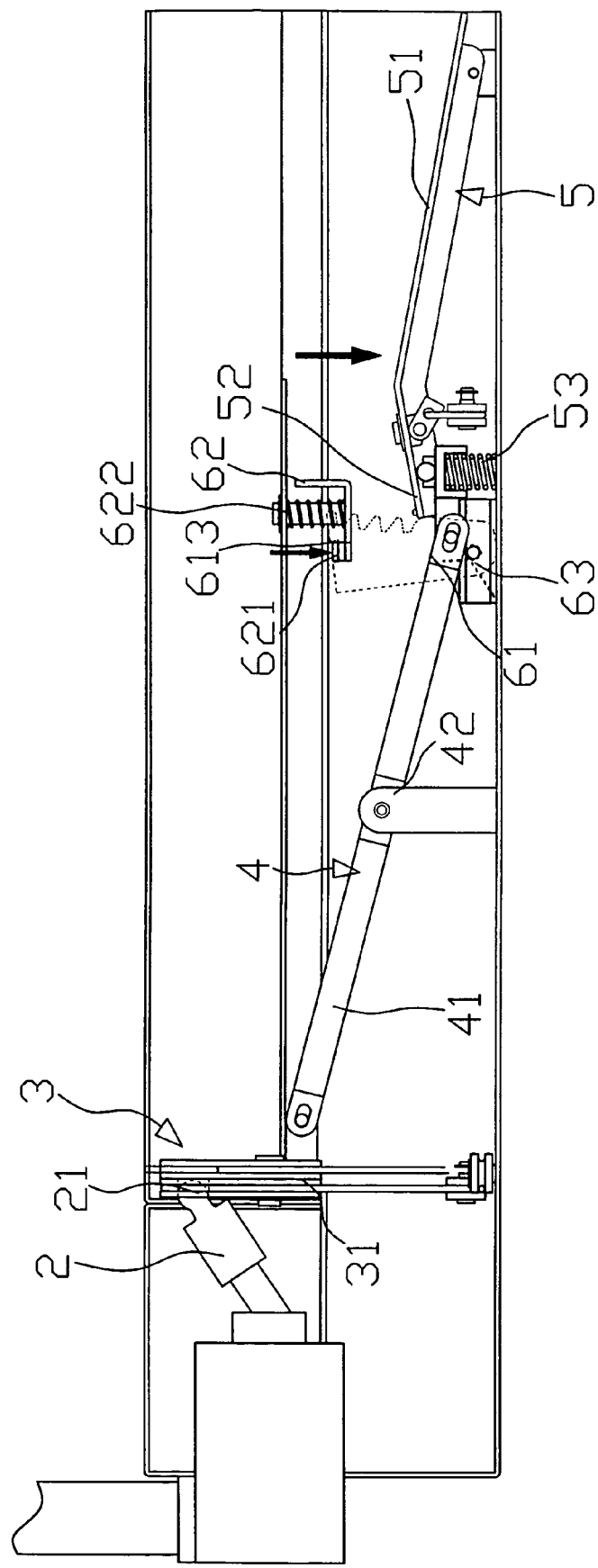
FIG. 9 is a schematic view showing that the water supply is about to being turned off in the first preferred embodiment of the present invention.

To shut off, the pedal 5 is further stepped deeper as illustrated in FIG. 9 for the trough 613 of the multi-stage catching plate 61 to move to the locking portion 621. The return member 622 pushes against the limit plate 62 for it to move downward to engage and secured the locking portion 621 in the trough 613; and in turn, the multi-stage catching plate 61 is secured in place by being confined by the limit plate 62. The pedal moves upward due to the force from the return member 53 to push against and up the limit plate 62 for the locking portion 621 to clear out of the trough 613 to release the limit on the multi-stage catching plate 61. The multi-stage catching plate 61 returns to its home position as illustrated in FIG. 4 while the orifice 21 also returns to its home position as illustrated in FIG. 3 in a status that no water is supplied.

Figure 10:
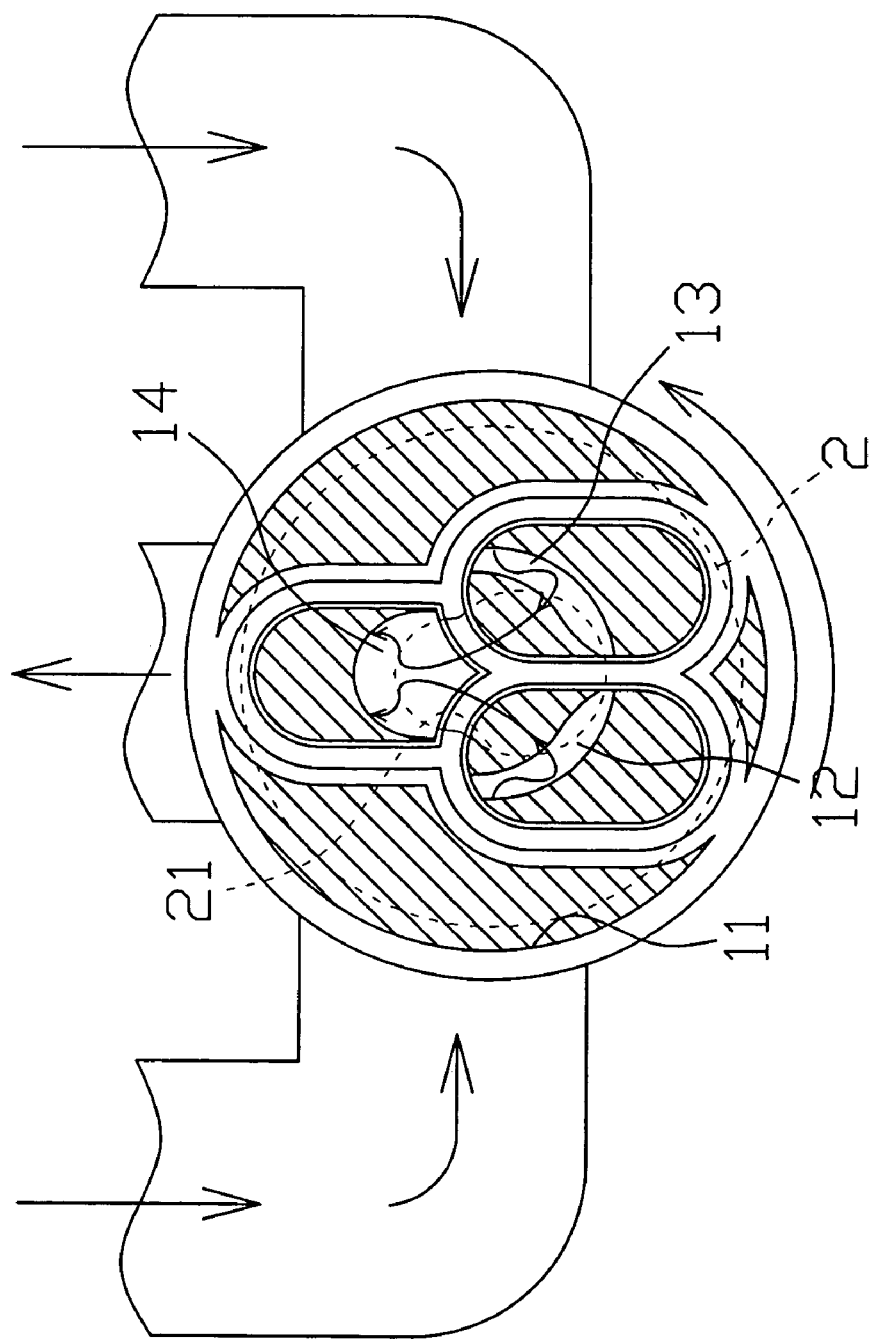
FIG. 10 is a schematic view showing a mixer construction of the first preferred embodiment of the present invention.
Figure 11:
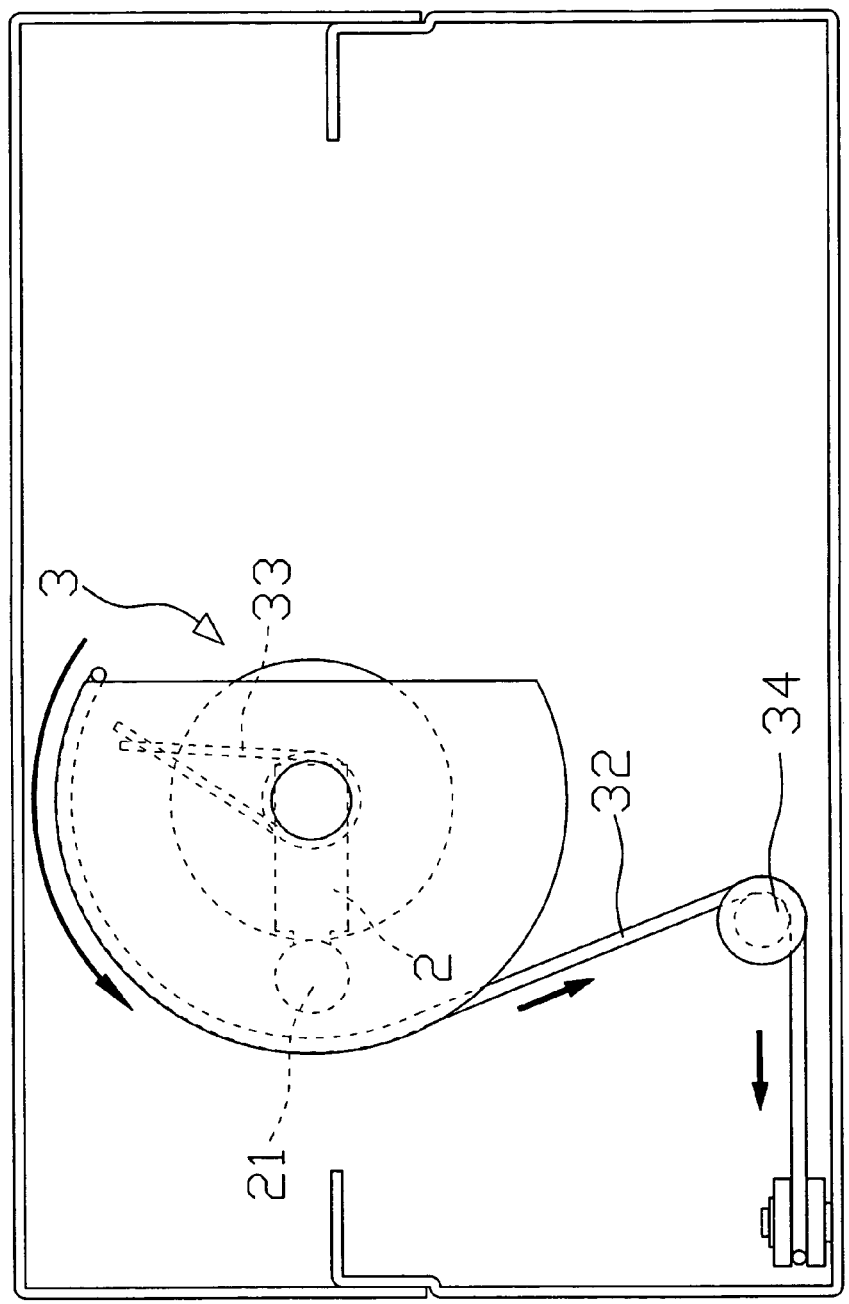
FIG. 11 is a schematic view showing an operating status of the temperature control unit in the first preferred embodiment of the present invention.
Figure 15:
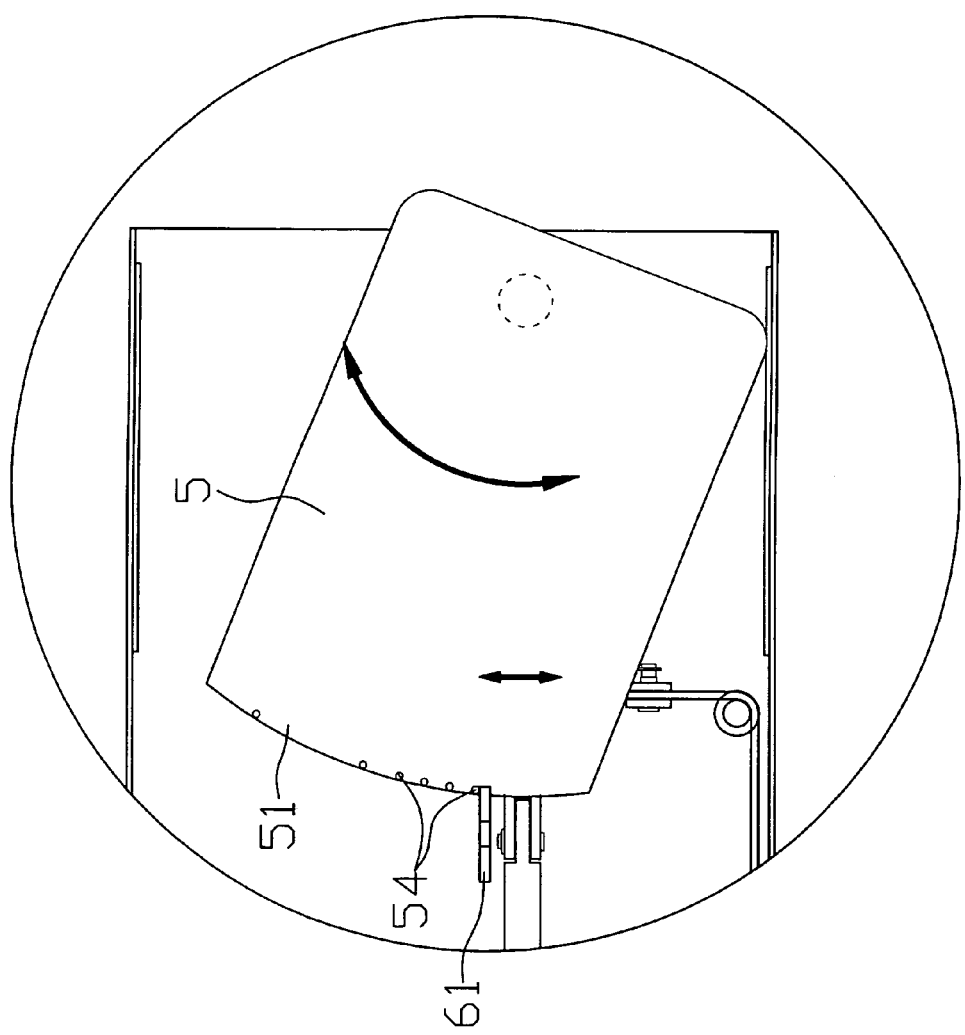
FIG. 15 is another schematic view showing that a pedal slides to its side of pedal in the preferred embodiment of the present invention.

To regulate the water temperature, the orifice 21 moves downward to partially overlap with the area of the coldwater inlet 12 and the water outlet 14 at the same time as illustrated in FIG. 6 by stepping on the pedal 5. As illustrated in FIG. 8, the orifice 21 is turned to its right for it to partially overlap with the area of the coldwater inlet 12, the hot water inlet 13 and the water outlet 14 for the coldwater and hot water respectively from the coldwater inlet 12 and the hot water inlet 13 to enter and mix in the chamber 11 before being delivered through the water outlet 14 as illustrated in FIG. 10. According to FIG. 7, rotating the orifice 21 is done first by stepping on the pedal 5 for it to be caught by the multi-stage catching plate 61 before sliding sideway. As illustrated in FIGS. 5 and 11, the pull force is transmitted to the turntable 31 by the drive member 32 through two pulleys 34 to turn the turntable 21 thus to rotate the orifice 21 of the control valve 2. Multiple projections 54 are provided on the upper or the lower surface of the pedal 5 at where closer to the locking block 51. As illustrated in FIG. 15, multiple projections 54 are disposed on the upper surface of the locking block 51 so that when the pedal being caught to the multi-stage catching plate 61 slides sideway to rotate, those projections 54 engaged with the side of the multi-stage catching plate 61 controls the rotation angle of the pedal to cause the orifice 21 to rotate at a different angle in the chamber to change the size of the area of the orifice 21 overlapped with the coldwater inlet and hot water inlet at the same time in regulating the temperature of the water delivered. Upon releasing the pedal, the turntable 31 returns from its status as illustrated in FIG. 11 to its home position as illustrated in FIG. 6 due to the force applied by the return member 33; and the pedal 5 also returns to its home position in a status only the coldwater is delivered as illustrated in FIGS. 7 and 8.

Figure 12:
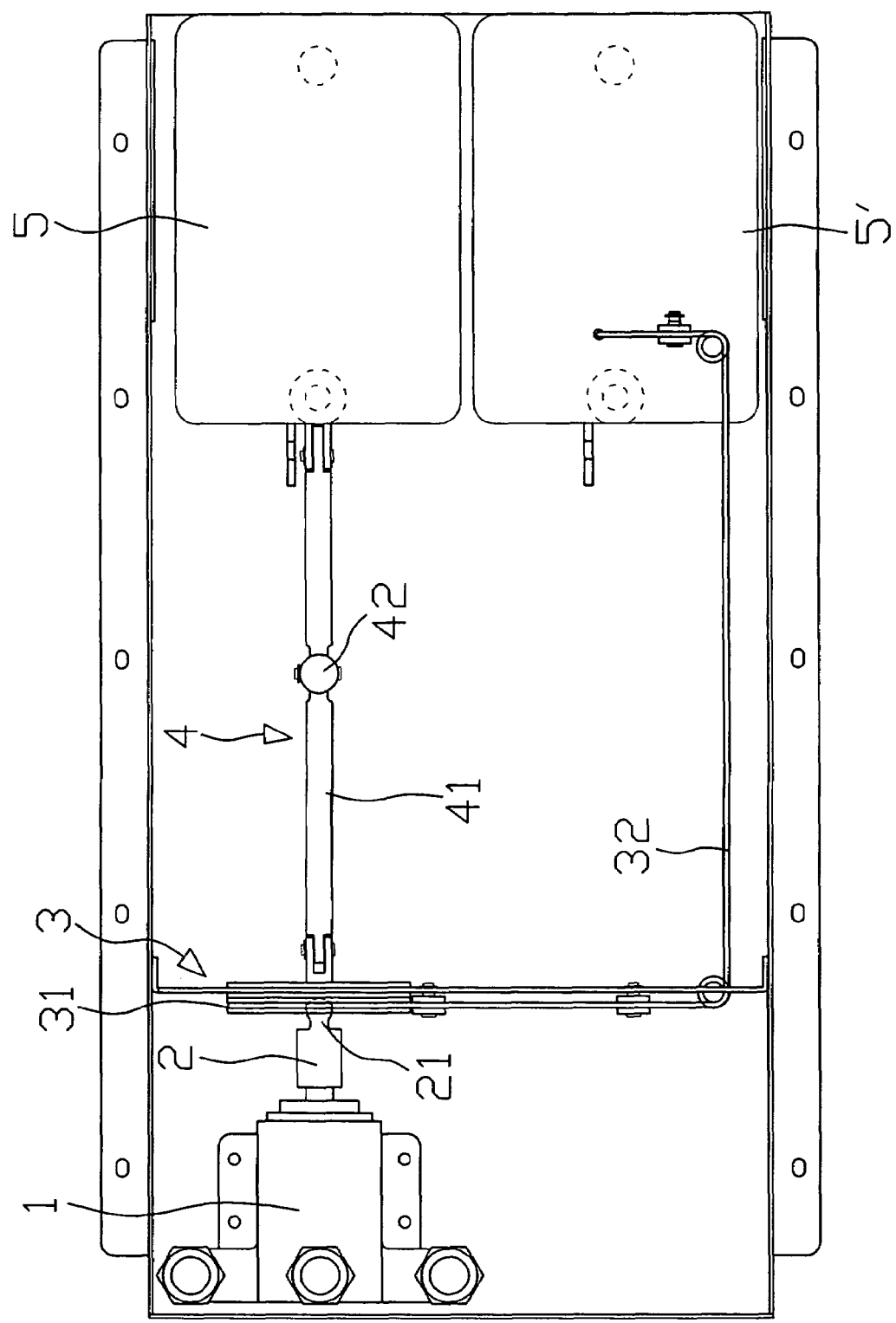
FIG. 12 is a schematic view showing a construction of a second preferred embodiment of the present invention.
Figure 13:
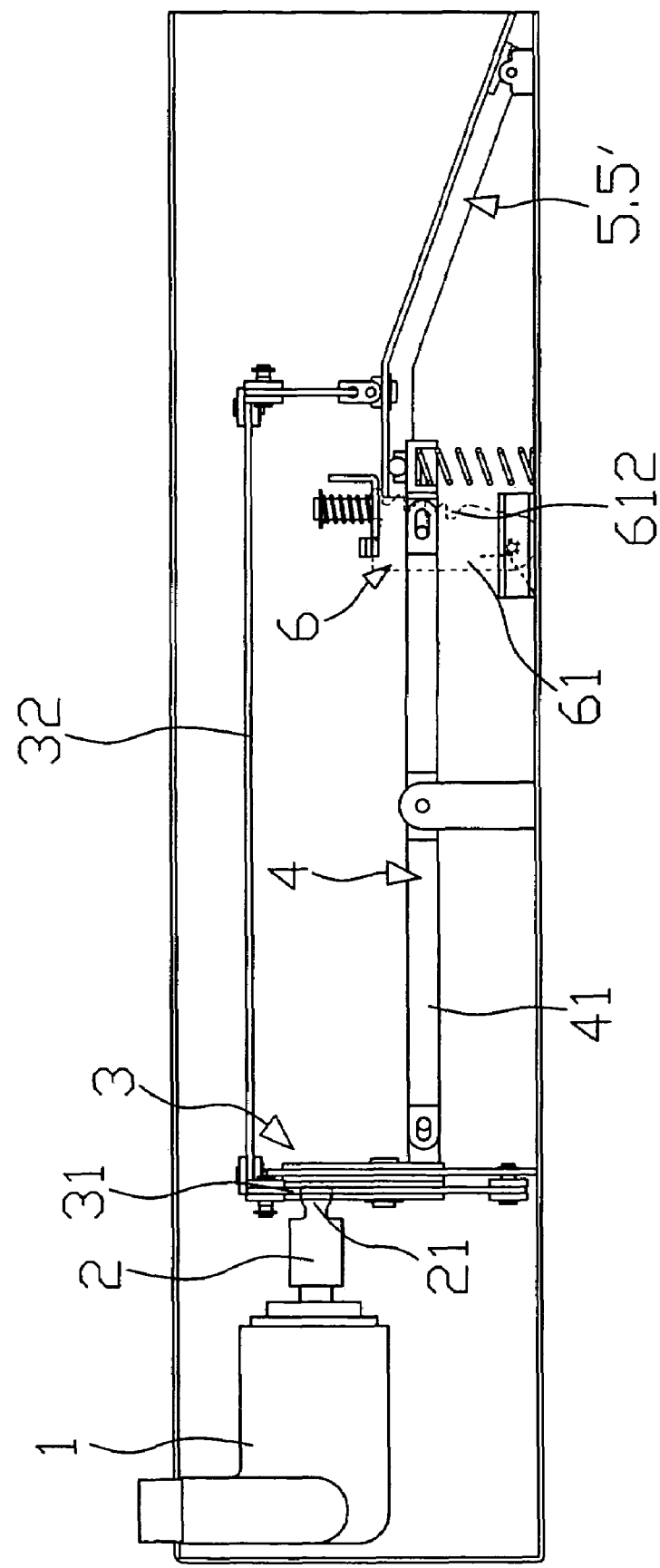
FIG. 13 is a side view showing the construction of the second preferred embodiment of the present invention.
Figure 14:
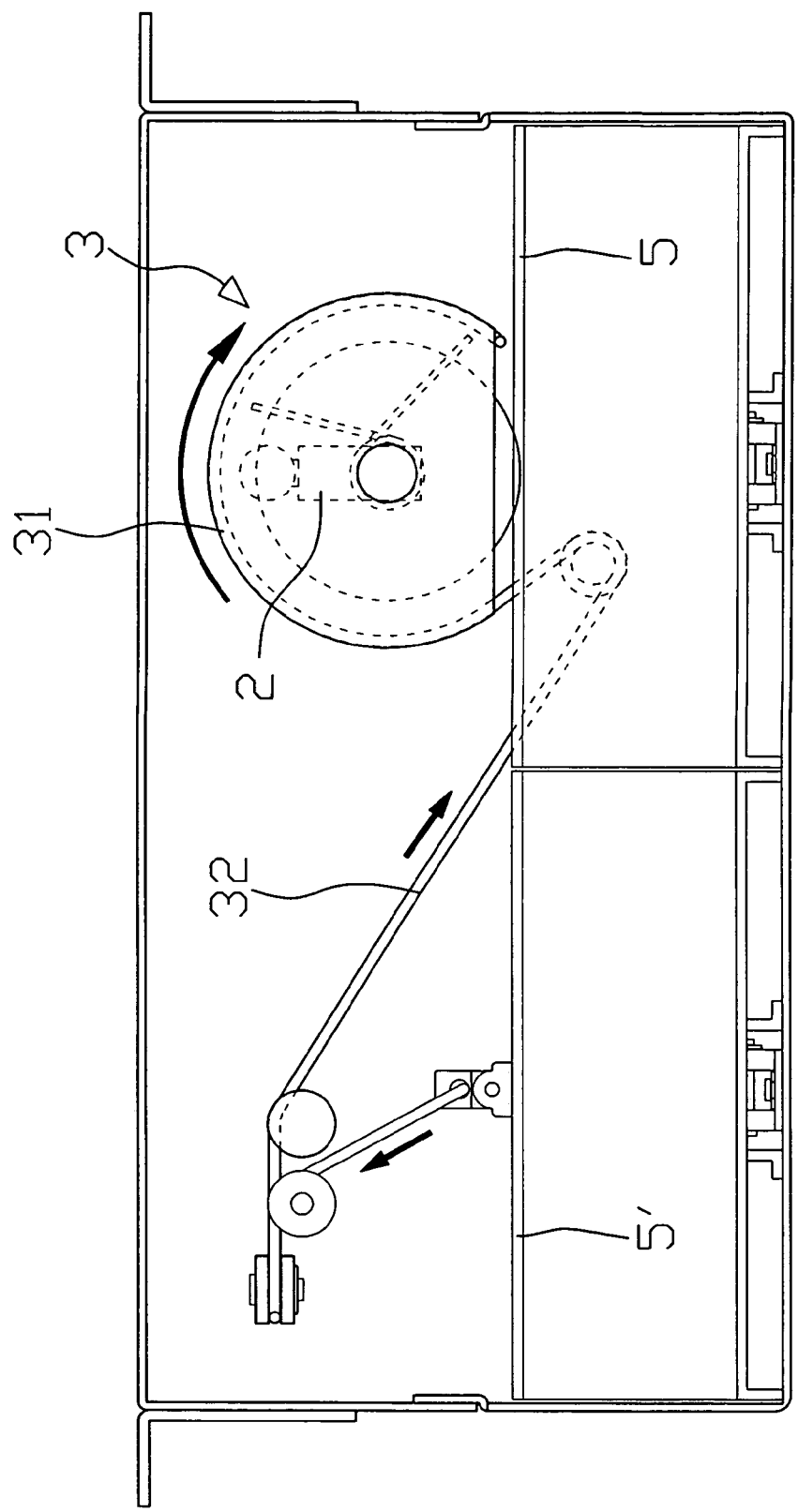
FIG. 14 is a schematic view showing an operating status of a temperature control unit in the second preferred embodiment of the present invention.

Now referring to FIG. 12 for another preferred embodiment of the present invention, two pedals 5, 5' are provided to the installation 10. One pedal 5 drives the control valve 2 to operate through the linking unit 4 and the other pedal 5' drives the control valve 2 to operate through the temperature control unit 3. As illustrated in FIG. 13, the overlapped area of the orifice at where between the water inlet and the water outlet can be changed by having the flow control unit 6 to interfere with the downward displacement of the pedal 5 thus to control the flow amount of the water at the water inlet to the water outlet. Similarly, the other pedal 5' when stepped causes the drive member 32 to pull the turntable 31 to rotate as illustrated in FIG. 14 thus to further turn around the control valve 2 to provide temperature control function by having the orifice 21 to move downward to be partially overlapped with the coldwater inlet 12 and the water outlet 14 at the same time by stepping on the pedal 5 as illustrated in FIG. 8 and then stepped on the other pedal 5' to have the area of the orifice 21 to be partially overlapped with that of the coldwater inlet 12, the hot water inlet 13, and the water outlet 14 as illustrated in FIG. 9.

It is to be noted that the present invention provides the following advantages:

1. Manual turning of the tap is not required. The water supply can be turned on even by a handicapped person losing his both hands simply to step upon the pedal or use any other tool (e.g., a walking stick or a wheel chair).

2. It is convenient for the user to step on the pedal to control the water flow rate and temperature while bending over in washing his/her hair in the bathroom.

3. With pedal control, the amount of water is delivered by stage as desired by the user; and the user does not have to step on the pedal all the time to maintain the water supply thanks to that the pedal is subject to the control by the multi-stage catching board.

4. The user by moving the pedal is capable of controlling the water temperature of the as he/she prefers.

5. Whenever the pedal is operated for the control of water temperature, it returns to its home position, i.e., the position for delivering coldwater. That is, only the coldwater is supplied first whenever water temperature regulation is desired thus to avoid from being burnt by hot water if the hot water is delivered first.

The prevent invention provides an improved structure of a multi-stage pedal control water supply installation, and the application for a utility patent is duly filed accordingly. However, it is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

I claim:

1. A multi-stage pedal control water supply installation comprising: a tap having a chamber having a water inlet and a water outlet; a control valve inserted into the chamber; the control valve forming an orifice by extending into the chamber and having a first side axially disposed on a first side of a linking unit; the linking unit is connected to the control valve and at least one pedal, the pedal controlling an operation of the control valve through the linking unit; and a flow control unit provided on a first side of the pedal to interfere with the displacement of the pedal thus to control the area of the control valve orifice overlapped between the water inlet and the water outlet, further comprising a temperature control unit, the linking unit is connected to the control valve by means of the temperature control unit; the linking unit further includes a cartridge stem; a locking end is disposed at a center portion of the stem and a first side of the stem is axially provided to the temperature control unit while a second side of the stem is axially disposed on the pedal so that when the pedal is stepped or released, the control valve moves up or down by means of the stem and the temperature control unit, wherein the tap is provided with a coldwater inlet and a hot water inlet; a turntable, a drive member and a return member are disposed on the temperature control unit; the control valve is axially provided on the turntable; a first side of the drive member is fixed below the turntable and, the drive member extends around the perimeter of the turntable before being connected to the pedals; and the turntable rotates as driven by the drive member to further turn around the control valve.

2. The multi-stage pedal control water supply installation as claimed in claim 1, wherein a ball assembly is provided on a second side of the control valve and connected to the first side of the linking unit.

3. The multi-stage pedal control water supply installation as claimed in claim 1, wherein the flow control unit is disposed on the first side of the pedal and includes a multi-stage catching plate containing a locking portion secured to the installation and positioned on the first side of the pedal, multiple catching portions being arranged at different levels on the first one side of the pedal and a trough being form at the top; a limit plate disposed over the multi-stage catching plate and the pedal containing a locking portion to engage with the trough and a return member; the return member being disposed on one side of the multi-stage catching plate at a point closer to the locking portion; accordingly, displacement of the control valve being determined by a selected catching portion engaged by the pedal to change the overlapped area of the orifice at where the water inlet and the water outlet thus to decide the amount of the water at the water inlet to flow into the water outlet; and while upon turning off the water supply, the pedal being further pressed deeper for the trough to move the trough of the multi-stage catching plate to where the locking portion is located, the return member then pushing down the limit plate for the multi-stage catching plate to be secured in place by the limit plate; the pedal moving upward due to the force from the return member; the multi-stage catching plate being released from the limit plate to return to it's a home position.

4. The multi-stage pedal control water supply installation as claimed in claim 3, wherein the pedal further includes an operating board for the user to step on; a locking block provided with multiple projections to extend into the multiple catching portions and secure in place therein; and a return member disposed at the bottom of the pedal.

5. The multi-stage pedal control water supply installation as claimed in claim 1, wherein the at least one pedal includes a first pedal operating the control valve through the linking unit and a second pedal operating the control valve through the temperature control unit.

6. The multi-stage pedal control water supply installation as claimed in claim 3, wherein the return member is a coil.

7. The multi-stage pedal control water supply installation as claimed in claim 4, wherein the return member is a coil.

8. A multi-stage pedal control water supply installation comprising a tap having a chamber having a coldwater inlet, a hot water inlet, and a water outlet; a control valve inserted into the chamber; a temperature control unit; the control valve extending into the chamber to form an orifice with another side axially disposed to a first side of the temperature control unit; the temperature control unit being connected to the control valve and a linking unit; the linking unit connecting the pedal and the control valve by means of the temperature control unit for the pedal to control the operation of the control valve; and at least one pedal controlling a movement of the control valve by means of the linking unit and the temperature control unit, wherein a first side of the pedal further includes a flow control unit; and the flow control unit further includes a multi-stage catching plate containing a locking portion secured to the installation on the first side of the pedal, multiple catching portions being arranged at different levels on the first side of the pedal and a trough being formed at the top; a limit plate disposed over the multi-stage catching plate and the pedal containing a locking portion to engage with the trough and a return member; the return member being disposed to one side of the multi-stage catching plate at a point closer to the locking portion; accordingly, displacement of the control valve being determined by a selected catching portion engaged by the pedal to change the overlapped area of the orifice at where between the water inlet and the water outlet thus to decide the amount of the water at the water inlet to flow into the water outlet; and while upon turning off the water supply, the pedal being further pressed deeper for the trough to move the trough of the multi-stage catching plate to where the locking portion is located, the return member then pushing down the limit plate for the multi-stage catching plate to be secured in place by the limit plate; the pedal moving upward due to the force from the return member; the multi-stage catching plate being released from the limit plate to return to a home position.

9. The multi-stage pedal control water supply installation as claimed in claim 8, wherein a ball assembly is formed in one side of the control valve to connect to one side of the linking unit.

10. The multi-stage pedal control water supply installation as claimed in claim 8, wherein the temperature control unit further includes a turntable on one side provided with a slot to pivot to the control valve and another side being pivoted to the linking unit; a drive member having one side fixed to where below the turntable and go around the perimeter of the turntable before being connected to the pedal; and a return member being disposed to the turntable to provide force to return the turntable to a home position after rotation; accordingly, the turntable being turned by the drive member when the pedal moves to further turn around the control valve.

11. The multi-stage pedal control water supply installation as claimed in claim 8, wherein the linking unit further includes a cartridge stem; a locking end is disposed at a center portion of the stem and a first side of the stem is axially provided to the temperature control unit while a second side of the stem is axially disposed on the pedal so that when the pedal is stepped or released, the control valve moves up or down by means of the stem and the temperature control unit.

12. The multi-stage pedal control water supply installation as claimed in claim 8, wherein the pedal further includes an operating board for the user to step on; a locking block provided with multiple projections extending into the multiple catching portions and secured in place therein; and a return member disposed at the bottom of the pedal.

13. The multi-stage pedal control water supply installation as claimed in claim 8, wherein the at least one pedal includes a first pedal operating the control valve through the linking unit and a second pedal operating the control valve through the temperature control unit.

* * * * *